3,033,805
LATENT-FOAMING VINYL AROMATIC RESIN COMPOSITIONS CONTAINING TETRAMETHYLSILANE AS BLOWING AGENT
Louis C. Rubens and Judith Sund Warren, Midland, Mich., assignors to The Dow Chemical Company, Midland, Mich., a corporation of Delaware
No Drawing. Filed Dec. 12, 1958, Ser. No. 779,865
4 Claims. (Cl. 260—2.5)

This invention relates to the production of foamed masses from thermoplastic resins. It relates more particularly to latent-foaming compositions of matter comprising thermoplastic vinyl aromatic resins having a novel foaming agent uniformly dispersed throughout, which compositions upon heating to the softening point of the resin and above, foam to form cellular masses composed for the most part of individually-closed thin-walled cells.

It is known to prepare porous or cellular masses from thermopalstic resins such as polystyrene, polymethylmethacrylate, polyisobutylene and the like by intimately incorporating a volatile organic liquid, e.g. pentane, hexane, heptane, acetone, methyl alcohol, isopropyl chloride, dipropyl ether or the like, with the polymer to form a solid product containing the volatile organic liquid uniformly dispersed throughout at ordinary temperatures and pressures, then to heat the resulting composition to the softening point of the polymer and above the boiling point of the volatile organic liquid whereby vapors of the volatile liquid expand the softened polymer to form a porous or cellular mass.

In the making of latent-foaming polymer compositions comprising a thermoplastic resin having a volatile organic compound dispersed throughout as blowing agent it has been observed that the volatile compounds often have a tendency to diffuse from the solid polymer, so that granules of the compositions must be used for their intended purpose within a relatively short time after their manufacture or they cannot be employed to make cellular masses of low density. In other words, the shelf-life or period of time for which the latent-foaming compositions can be stored, prior to their use for making cellular masses is much less than is desired.

It is an object of the invention to provide latent-foaming thermoplastic resin compositions comprising a thermoplastic vinyl aromatic resin having a novel volatile foaming agent uniformly dispersed throughout, which compositions possess improved storage life and can be foamed to produce cellular masses composed of uniform fine cells and of low density. Other and related objects may appear from the following description of the invention.

According to the invention latent-foaming polymer compositions possessing good storage life and suitable for making cellular masses composed of uniform individually-closed thin-walled cells can readily be prepared by intimately incorporating from 2 to 15 percent by weight of tetramethylsilane with a thermoplastic vinyl aromatic resin to form a normally solid substantially non-porous product having the tetramethylsilane uniformly dispersed throughout.

The term "vinyl aromatic resin" employed herein pertains to the polymers and copolymers of one or more monovinyl aromatic hydrocarbons of the benzene series or a nuclear halogenated derivative thereof or a copolymer of one or more of such monovinyl aromatic compounds, or copolymers of such monovinyl aromatic compounds with from 0.01 to 0.5 percent by weight of a polyvinyl aromatic hydrocarbon, e.g. divinylbenzene, divinyltoluene, divinylxylene or the like. Examples of monovinyl aromatic compounds are styrene, vinyltoluene, vinylxylene, ethylvinylbenzene, isopropylstyrene, tert.-butylstyrene, chlorostyrene, dichlorostyrene, fluorostyrene, bromostyrene, ar-chlorovinyltoluene, ar-ethylchlorostyrene and the like.

The latent-foaming compositions can be prepared by mixing the tetramethylsilane foaming agent in the desired proportions with the monomers and heating the solution in mass or while dispersed as droplets in an inert nonsolvent liquid such as water or brine to polymerize the monomers to a solid form. Polymerization of the monomers in the solution while it is dispersed as droplets in an aqueous liquid medium is preferred since it permits the obtaining of the product in the form of beads or rounded granules which can conveniently be handled, and the size of the beads can readily be controlled. The polymerization can be carried out at temperatures between about room temperature and 130° C. and at atmospheric or superatmospheric pressures.

Other ways of incorporating the tetramethylsilane foaming agent will be apparent to those skilled in the art. For example, a mixture of a thermoplastic vinyl aromatic resin, e.g. polystyrene, in the form of discrete particles and the tetramethylsilane can be heated under pressure in a pressure resistant vessel at temperatures between 80° and 125° C. until the resin has absorbed 2 percent by weight or more, suitably from 2 to 15 percent by weight of the tetramethylsilane, after which the mixture is cooled to a temperature below 40° C., the pressure is released and the product removed from the vessel.

The latent-foaming polymeric compositions of the invention possess excellent shelf-life, i.e. they can be stored for prolonged periods of time such as from two to eight weeks after manufacture without loss of an appreciable amount of the tetramethylsilane foaming agent by diffusion from the polymer at ordinary temperatures and pressures. The products can be foamed to form cellular masses of low density and composed of fine uniform individually-closed thin-walled cells. The compositions are useful for making cellular masses having a predetermined shape by foaming a body of the material in a mold, e.g. a board or sheet, which can be used as insulating material in the home and industry.

The following examples illustrate ways in which the principle of the invention has been applied, but are not to be construed as limiting its scope.

EXAMPLE 1

A charge of 92.42 percent by weight of styrene, 0.04 percent of ethylvinylbenzene and 0.04 percent of divinylbenzene, together with 0.5 percent of azobis-isobutyronitrile as polymerization catalyst and 7 percent of tetramethylsilane, as foaming agent, was sealed in a glass ampoule. The monomers were polymerized by heating the ampoule 2 days at 80 C.; 1 day at 100° C. and 1 day at 125° C. Thereafter, the ampoule was cooled and broken. The product was removed as a solid block of the polymer in the form of a clear glass rod containing the tetramethylsilane uniformly dispersed throughout. Test pieces were cut from the block of the copolymer. The test pieces were placed in an air oven and heated at temperatures as stated in the following table for a period of 10 minutes. The product foamed to a cellular mass having a density and cell structure as stated in Table I.

Table I

| Foaming Conditions | | Foamed Product | |
|---|---|---|---|
| Temp., °C. | Time, Min. | Foam Density, lbs./cu. ft. | Cell Structure |
| 125 | 10 | 2.07 | fine, uniform. |
| 137 | 10 | 1.20 | Do. |
| 145 | 10 | 0.82 | Do. |
| 160 | 10 | 0.92 | Do. |

A test piece of the composition as initially prepared when heated at a temperature of 130° C. formed a cellular mass having fine uniform cells and a volume 70.5 times as great as the volume of the starting test piece. After storage in air at room temperature and atmospheric pressure for a period of 12 months, a test piece of the composition foamed to a cellular mass having a volume 70 times greater than the initial volume of the test piece.

In contrast, a composition prepared in similar manner, but with 8 percent of isopentane as foaming agent, when heated at 130° C. for 10 minutes, foamed to a cellular mass having a density of 3.82 pounds per cubic foot and had large non-uniform cells.

EXAMPLE 2

In each of a series of experiments, a charge of 89.92 percent by weight of dichlorostyrene, 0.04 percent of ethylvinylbenzene and 0.04 percent of divinylbenzene, together with 10 percent of tetramethylsilane as foaming agent was sealed in a glass ampoule and polymerized by heating the same under time and temperature conditions as follows: 1 day at 25° C.; 2 days at 50° C.; and 4 days at 80° C. Thereafter, the ampoule was cooled. It was broken and the product removed. The product was a transparent solid rod containing the tetramethylsilane uniformly dispersed throughout. The dichlorostyrene employed in the experiment was a mixture of approximately 42 percent by weight of 2,4-dichlorostyrene, 22.5 percent of 2,5-dichlorostyrene, 11.3 percent of 2,6-dichlorostyrene, 12 percent of 2,3-dichlorostyrene, 12 percent of 3,5-dichlorostyrene and 0.02 percent unknown. Test pieces were cut from the solid rod of the product. These test pieces were heated in an air oven at temperatures and for a time as stated below. The product foamed to a cellular mass having a density and cell structure as stated in Table II.

Table II

| Foaming Conditions | | Foamed Product | |
|---|---|---|---|
| Temp., °C. | Time, Min. | Foam Density, lbs./cu. ft. | Cell Structure |
| 150 | 8 | 1.6 | fine, uniform. |
| 160 | 20 | 0.91 | Do. |
| 170 | 10 | 1.0 | Do. |

Similar results were obtained upon foaming test pieces of the compositions under similar conditions, after storage of the compositions in air at room temperature and atmospheric pressure for a period of 30 days.

EXAMPLE 3

A charge of 89.5 percent by weight of dichlorostyrene similar to that employed in Example 2, together with 0.5 percent of benzoyl peroxide as polymerization catalyst and 10 percent of tetramethylsilane was sealed in a glass ampoule and polymerized by heating the same for 1 day at 25° C.; 2 days at 50° C.; and 4 days at 80° C. The product was a glass-clear solid containing the tetramethylsilane uniformly dispersed throughout. A test piece of the product was immersed in an inert oil bath maintained at a temperature of 150° C. for a period of 4 minutes. The composition foamed to a cellular mass having a density of 2.35 pounds per cubic foot of the foam and was composed of uniform fine cells.

We claim:

1. A latent-foaming thermoplastic composition of matter comprising from 85 to 98 percent by weight of a normally solid non-porous thermoplastic vinyl aromatic resin consisting of at least one polymerized vinyl aromatic compound selected from the group consisting of (a) monovinyl aromatic hydrocarbons of the benzene series, (b) nuclear halogenated monovinyl aromatic hydrocarbons of the benzene series and (c) from 99.5 to 99.99 percent by weight of at least one of the compounds (a) and (b) and from 0.5 to 0.01 percent of a divinyl aromatic hydrocarbon of the benzene series, and from 15 to 2 percent of tetramethylsilane uniformly dispersed throughout said vinyl aromatic resin.

2. A latent-foaming thermoplastic composition according to claim 1, wherein the non-porous thermoplastic vinyl aromatic resin is polystyrene.

3. A latent-foaming thermoplastic composition according to claim 1, wherein the non-porous thermoplastic vinyl aromatic resin is polymerized dichlorostyrene.

4. A latent-foaming thermoplastic composition according to claim 1, wherein the non-porous thermoplastic vinyl aromatic resin is a copolymer of from 99.5 to 99.99 percent by weight of dichlorostyrene and from 0.5 to 0.01 percent of divinylbenzene.

References Cited in the file of this patent

UNITED STATES PATENTS

| 2,813,839 | Rust et al. | Nov. 19, 1957 |
| 2,833,732 | Weyer | May 6, 1958 |
| 2,848,428 | Rubens | Aug. 19, 1958 |

FOREIGN PATENTS

| 553,512 | Canada | Feb. 25, 1958 |

OTHER REFERENCES

Rochow: "Chemistry of the Silicones," 2nd edition, published by John Wiley and Sons, New York, 1951, page 171.